Jan. 19, 1926.

H. E. DURTSCHE

GAUGE

Filed April 27, 1925

1,570,558

Inventor

Henry E. Durtsche

By Baker, Macklin, Golrick & Pear,
Attorneys

Patented Jan. 19, 1926.

1,570,558

UNITED STATES PATENT OFFICE.

HENRY E. DURTSCHE, OF GALION, OHIO.

GAUGE.

Application filed April 27, 1925. Serial No. 26,009.

*To all whom it may concern:*

Be it known that I, HENRY E. DURTSCHE, a citizen of the United States, residing at Galion, in the county of Crawford and State of Ohio, have invented a certain new and useful Improvement in a Gauge, of which the following is a full, clear, and exact description, reference being had to the accompanying drawings.

This invention relates to a gauge which is designed especially for use in connection with the inspection of dimensions and clearances on locomotives, such as ladder rungs, hand rails, hand grabs, steps, uncoupling levers and so on. The inspection of such parts is usually directed toward the determination of minimum clearance and thickness required to insure safety.

It is an object of the present invention to provide a one-piece gauge which is so shaped that the desired minimum limits are defined by portions thereof compactly arranged and readily accessible. In this connection my invention contemplates the provision of a gauge having suitable recesses, the walls of which provide different limiting dimensions, whereby I obtain a large number of limiting dimensions upon a comparatively small gauge.

I carry out the above objects by employing a substantially rectangular piece of metal and having indentations on the sides, and having a lateral extension adjacent one side. These indentations have oppositely facing tongues which enable the diameter of a member to be readily determined. Moreover, I so form the gauge that each corner embodies a right angle, wherefore the overall length of the sides may be used for limit measurements. In this way I provide a single gauge which may be readily used for example in measuring all the locomotive clearances covered by prescribed minimum safety requirements, for example from $\frac{3}{16}$ inch to 4 inches.

Figure 1:
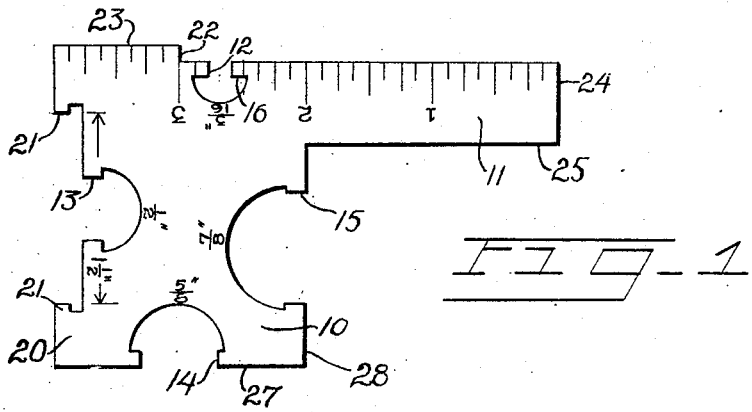
Figure 2:
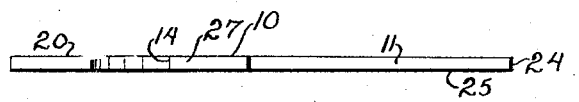
Figure 3:
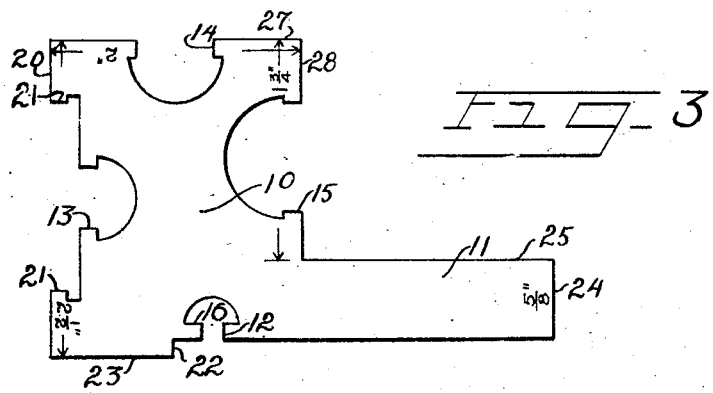

My invention is shown in the accompanying drawings, wherein Fig. 1 is a front elevation of the gauge; Fig. 2 is a plan view taken along the bottom edge of the gauge, and Fig. 3 is a rear elevation of the gauge.

The gauge embodying my invention has a body portion 10 and a laterally extending portion 11 which is integral therewith. The bottom and sides of the body portion are shown as being serrated and as having opposed tongues to provide different outside diameter limits, while the sides and top have different overall limits.

The outside diameter limits are indicated at 12, 13, 14 and 15 as defining limits of $\frac{3}{16}''$, $\frac{5}{8}''$, $\frac{1}{2}''$ and $\frac{7}{8}''$ respectively. The body portion adjacent each of said outside diameter limits has a recess which may conveniently be semi-circular. The depth of this recess is somewhat more than half the distance between the gauge points so that a round bar may enter the recess sufficiently to bring the diameter of the bar well between the gauge faces. I find it convenient for example, to make the recess for the $\frac{7}{8}''$ gauge of $\frac{1}{2}''$ radius struck from a center along the line connecting the inner edges of the gauge faces. Similarly the recess for the $\frac{5}{8}''$ gauge may be of $\frac{3}{8}''$ radius and so on.

The side 20 in addition to the limiting tongues 13 has limiting tongues 21 which may be used for determining the minimum thickness of a member. The limits defined by the tongues 21 are indicated in Fig. 1 as one and one-half inches. The outermost limit of the side 20 is shown in Fig. 3 as defining two and one-half inches.

Along one edge of the body portion I have indicated a shoulder 22 providing an edge 23 having an overall limit of one inch. The remaining portion of the top edge of the body portion merges with the top edge of the lateral extension 11 so as to provide a three inch gauge from the shoulder 22 to the outermost end 24 of the extension. The width of the extension is indicated in Fig. 3 as being $\frac{5}{8}''$, while the lower surface 25 of the extension is shown as being 2'' in length.

In addition to the limits which are defined by the recessed portions, I so form my gauge that the overall length of each side has a predetermined limit. For example, the overall distance of the bottom edge 27 is two inches; that of the side 20 is shown as $2\frac{1}{2}''$; the distance between the side 20 and the end 24 is 4''; while the side 28 which extends from the bottom 27 to the extension 25 is $1\frac{3}{4}''$.

From the foregoing description, it will be evident that I have provided a simple tool wherein a large number of limiting distances are provided on a comparatively small single-piece gauge. The use of a single gauge having the required predetermined limits enables an inspector to reduce materially the time for making an inspection.

Having thus described my invention, I claim:

1. A gauge having a body portion and having a lateral extension integral therewith and projecting from one edge of the body portion, said extension being provided with a scale, and the body portion having a recess in one of its other edges to define an outside measurement.

2. A gauge comprising a single piece member having a body portion and a laterally extending portion, each of said portions having the edges thereof disposed at right angles to each other, one of the edges on the body portion being in alignment with one of the edges on the laterally extending portions, said body portion having recesses in different edges thereof, there being oppositely facing tongues associated with each recess to define a limiting distance, the limiting distance of each recess being different from the limiting distances of the remaining recesses.

3. A gauge having a body portion and a laterally extending portion, the body portion having each side arranged at right angles to the adjacent side, each of said sides having a recess therein, and a pair of inwardly projecting tongues associated with each recess to define a limiting distance, each of which is different from the remaining limiting distances, the respective sides having different overall limiting distances.

4. A gauge comprising a one-piece member, having a body portion and a laterally extending portion, the body portion having two sides thereof parallel and having a third side arranged at right angles to the parallel sides, one of the parallel sides having a plurality of recesses therein, each recess having a pair of oppositely facing tongues, each pair of tongues defining a limiting distance, the remaining sides of the body portion also having a recess therein, and having a pair of tongues associating with each recess to provide other limiting distances, each of said limiting distances being different from the remaining distances.

In testimony whereof, I hereunto affix my signature.

HENRY E. DURTSCHE.